Nov. 25, 1969 J. F. RITCHEY ET AL 3,480,730

TELEPHONE REPORTING SET

Filed June 1, 1966 6 Sheets-Sheet 1

INVENTORS J. F. RITCHEY
L. D. TATE
R. E. WADDELL

BY Harry L. Newman

ATTORNEY

Nov. 25, 1969 J. F. RITCHEY ET AL 3,480,730

TELEPHONE REPORTING SET

Filed June 1, 1966

6 Sheets-Sheet 3

TELEPHONE REPORTING SET

Filed June 1, 1966

3,480,730
TELEPHONE REPORTING SET

James F. Ritchey, Carmel, Louis D. Tate, Fountaintown, and Richard E. Waddell, Indianapolis, Ind., assignors to Bell Telephone Laboratories, Incorporated, Murray Hill and Berkeley Heights, N.J., a corporation of New York Filed June 1, 1966, Ser. No. 554,431
Int. Cl. H04m *11/04*
U.S. Cl. 179—5 11 Claims

ABSTRACT OF THE DISCLOSURE

An apparatus for reporting alarm conditions at an unattended location includes an automatic dialer for calling a preselected station, an amplifier-oscillator circuit for transmitting an identification signal to the called station, a record-play circuit for transmitting a prerecorded message to the called station, and a detector circuit for responding to signals received from the called station. Conductive patterned discs rotate relative to spaced contacts for providing switching logic.

This invention relates to telephone sets for automatically reporting the occurrence of a predetermined condition and particularly to such sets that report to a supervisory station via the switched telephone network.

The reporting set of the present invention has two modes of operation, alarm and inquiry. The alarm mode of operation is initiated by the occurrence of the predetermined condition, and consists of a dialing period, a waiting period, and a reporting period.

During the dialing period, the reporting set seizes the telephone line and after a several second delay for dial tone, dials the telephone number of the supervisory station. Then for the balance of the time remaining in the dialing period, the set transmits a prerecorded message that gives the location of the set and the condition that has occurred. During the waiting period the reporting set transmits an audible signal that serves to identify the set should the supervisory station answer during this time, and finally, during the reporting period the set again transmits the prerecorded message. Bursts of the identification signal are superimposed upon the recorded message if the predetermined condition continues as of the time the message is transmitted.

The supervisory station exercises control over the reporting set by means of a supervisory signal. If the signal is sent during the waiting period, the period is terminated and the reporting period is initiated. If the supervisory signal is sent during the dialing period or the reporting period, the set disconnects from the telephone line and resets to a standby condition. If, on the other hand, the supervisory signal is not sent during either the dialing or the reporting periods, the set disconnects from the telephone line at the end of the reporting period, waits for a while, and then repeats the aforedescribed sequence up to a total of nine times. After that it resets to a standby condition.

The inquiry mode of operation of the reporting set is initiated by an incoming call. After several rings, the reporting set connects to the telephone line and transmits the identification signal for a short duration. If the supervisory signal is not sent during this time, the reporting set disconnects from the telephone line and resets to a standby condition. If, however, the supervisory signal is sent during this time, transmission of the identification signal ceases and the reporting period of the alarm mode of operation commences. Thus the prerecorded message is transmitted, and if the supervisory signal is sent, the reporting set is reset to a standby condition. Otherwise, it disconnects from the telephone line and after a short delay proceeds with the entire alarm mode of operation. If the predetermined condition exists as of the time the prerecorded message is transmitted, bursts of the identification signal are again superimposed thereon.

Hence it is seen that the inquiry mode of operation permits the supervisory station to test the operation of the reporting set. In addition, it permits the supervisory station to determine whether the predetermined condition exists at the time the reporting set is called.

A complete understanding of the invention and of these and other features and advantages thereof may be gained from consideration of the following detailed description which in conjunction with the accompanying drawing discloses one embodiment of the invention. It is to be expressly understood, however, that the drawing and description are not to be construed as defining the limits of the invention.

Figures 3, 7:
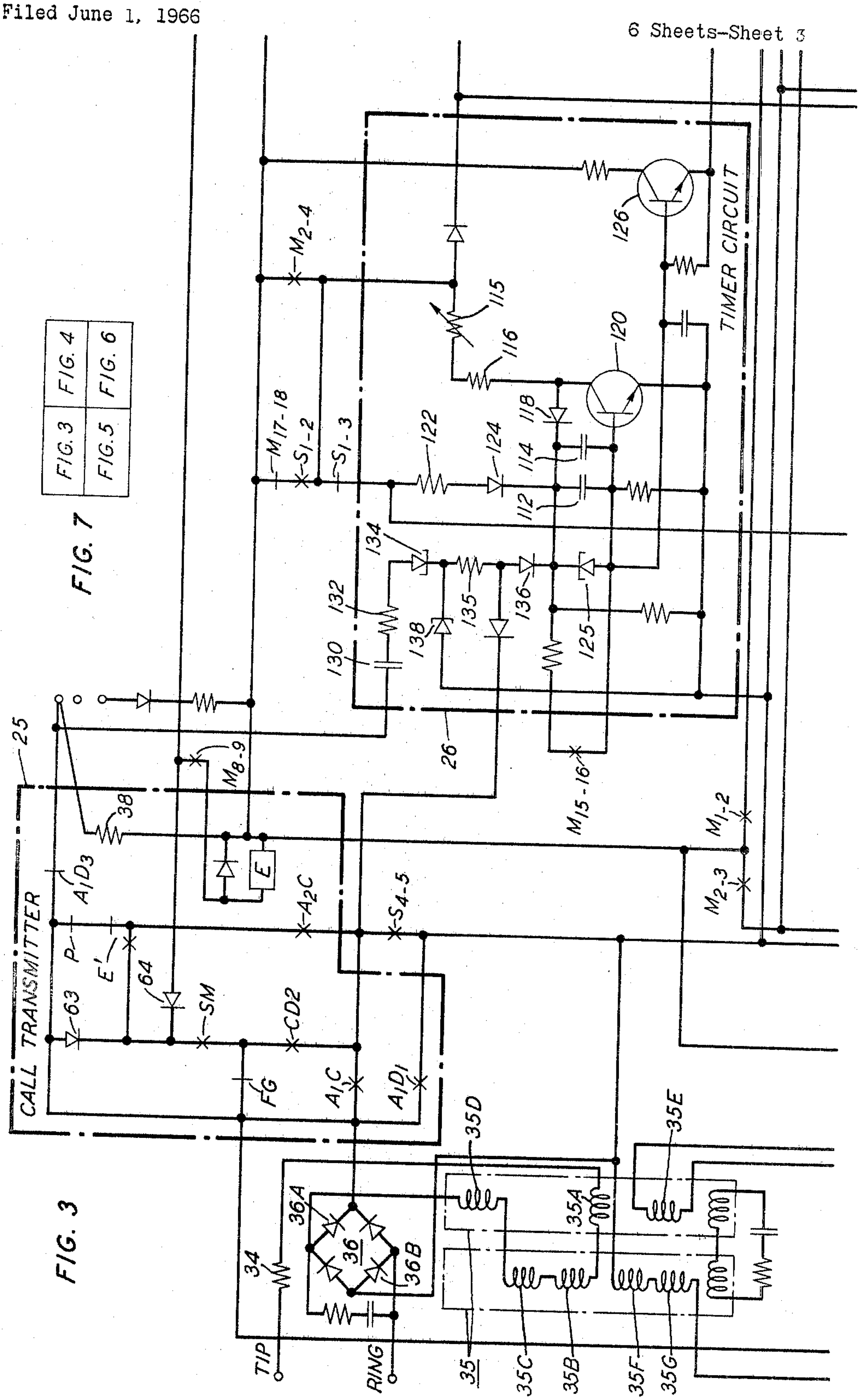
Figure 4:
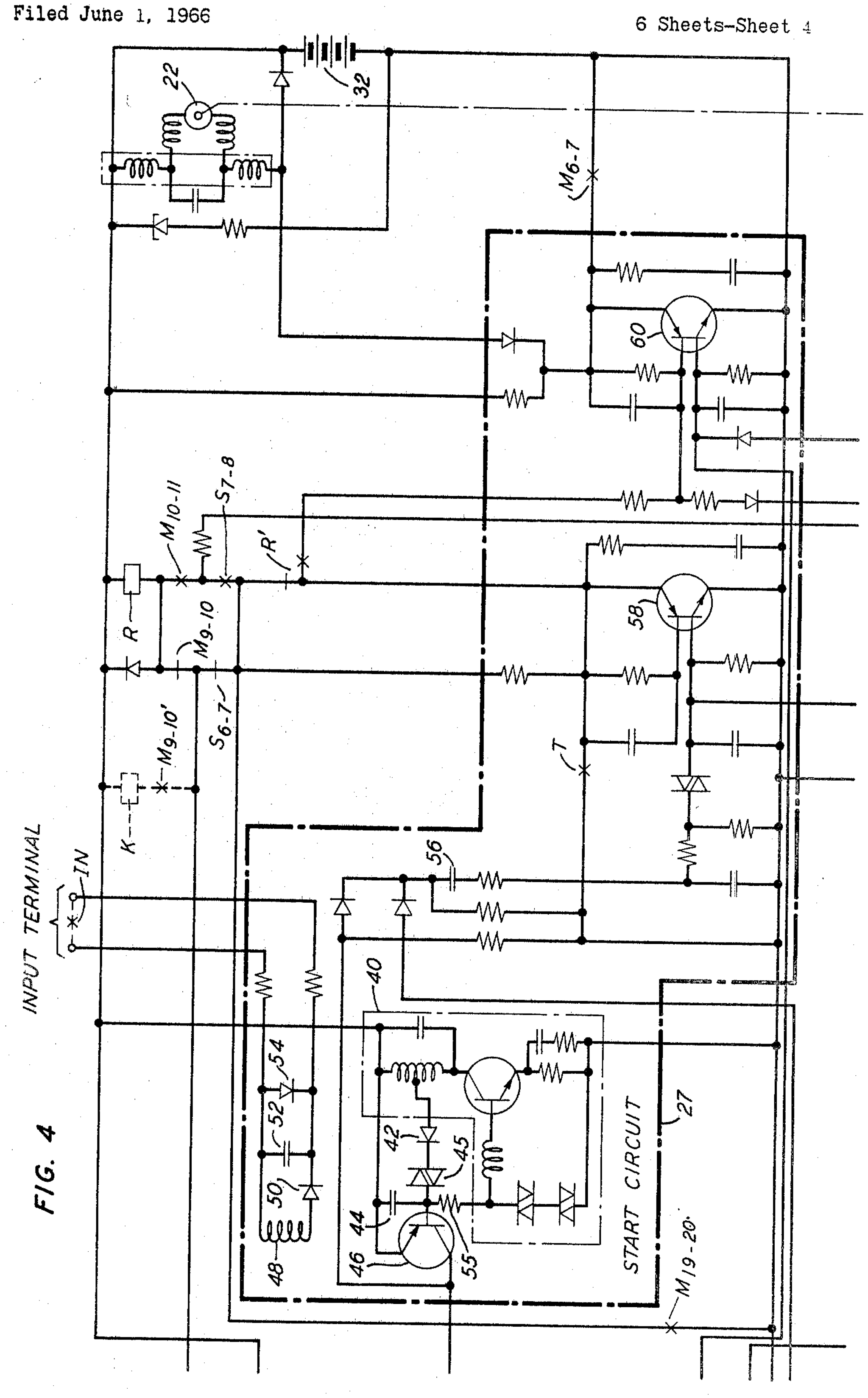
Figure 5:
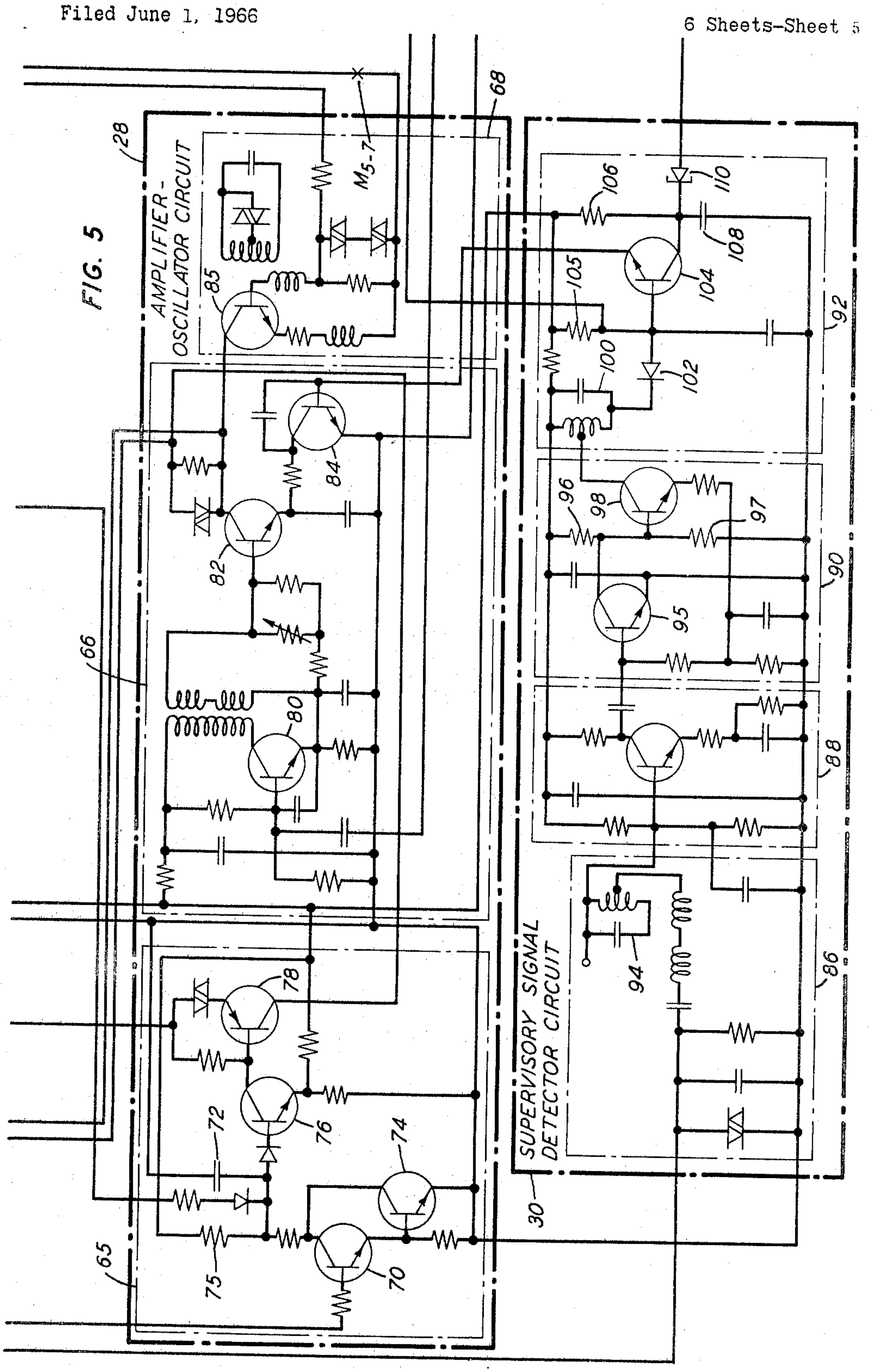
Figure 6:
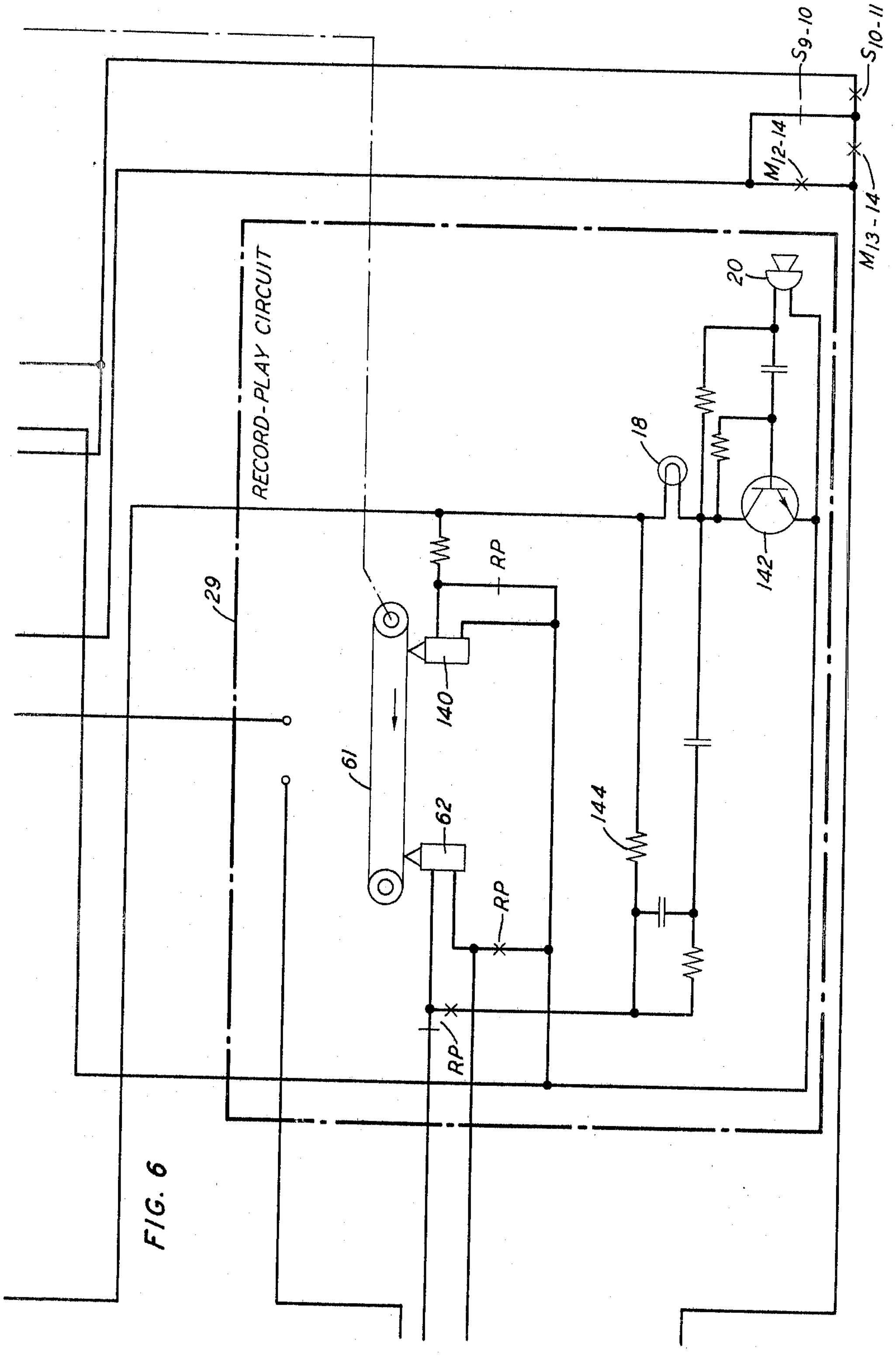

FIGS. 3, 4, 5, and 6 combine to provide a schematic circuit diagram of the reporting set; and FIG. 7 shows how FIGS. 3, 4, 5, and 6 are to be oriented with respect to one another.

Figure 1:
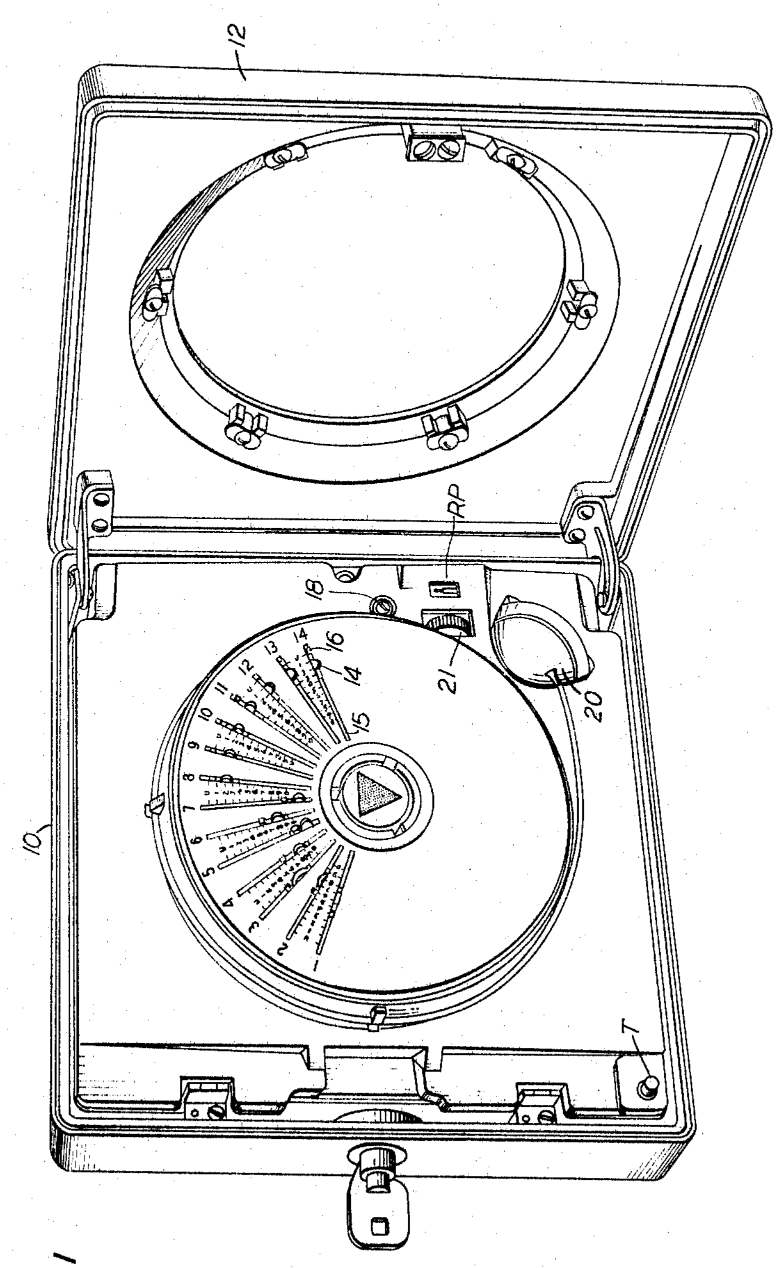
FIG. 1 is a perspective view of a reporting set employing the present invention, the front cover of the set being open to show details of the set more clearly.

Referring to the drawing and FIG. 1 in particular, the reporting set is enclosed within a rectangular housing 10 having a lockable cover 12. When the cover 12 is open, it provides access to the controls by which the user of the set selects the telephone number the set is to call, the telephone number being that of a supervisory station. In addition, the cover 12 when open also provides access to the controls by which the user of the set records the message that it is to transmit.

Among these controls is a group of fourteen selectors 14 each of which is operative to select a single digit of the telephone number of the supervisory station. The selectors 14 are numbered from left to right, and each is slidably displaceable along the length of an associated slot 15. Indicia comprising the letter U and the numbers one through zero are spaced alongside of each slot 15, and a digit is selected by positioning the corresponding selector 14 so that a boss 16 thereon is in alignment with the indicium corresponding to the value of the digit.

Thus, if the telephone number of the supervisory station is 464–6079, the first selector 14 is positioned with the boss 16 thereof in alignment with the number four, the second selector is positioned with the boss thereof in alignment with the number six, and so on. The eighth through fourteenth selectors 14 are positioned with the bosses 16 thereof in alignment with the letter U since with a seven digit telephone number these selectors are unused.

Other controls exposed when the cover 12 of the housing 10 is open comprise a record-play switch RP, a record lamp 18, and a microphone 20. As hereinafter described, all of these are employed in recording the message that the reporting set is to transmit. In addition, there is a volume wheel 21 for controlling the level at which the recorded message is transmitted and a test pushbutton switch T for checking the operation of the reporting set at the place of installation.

Figure 2:
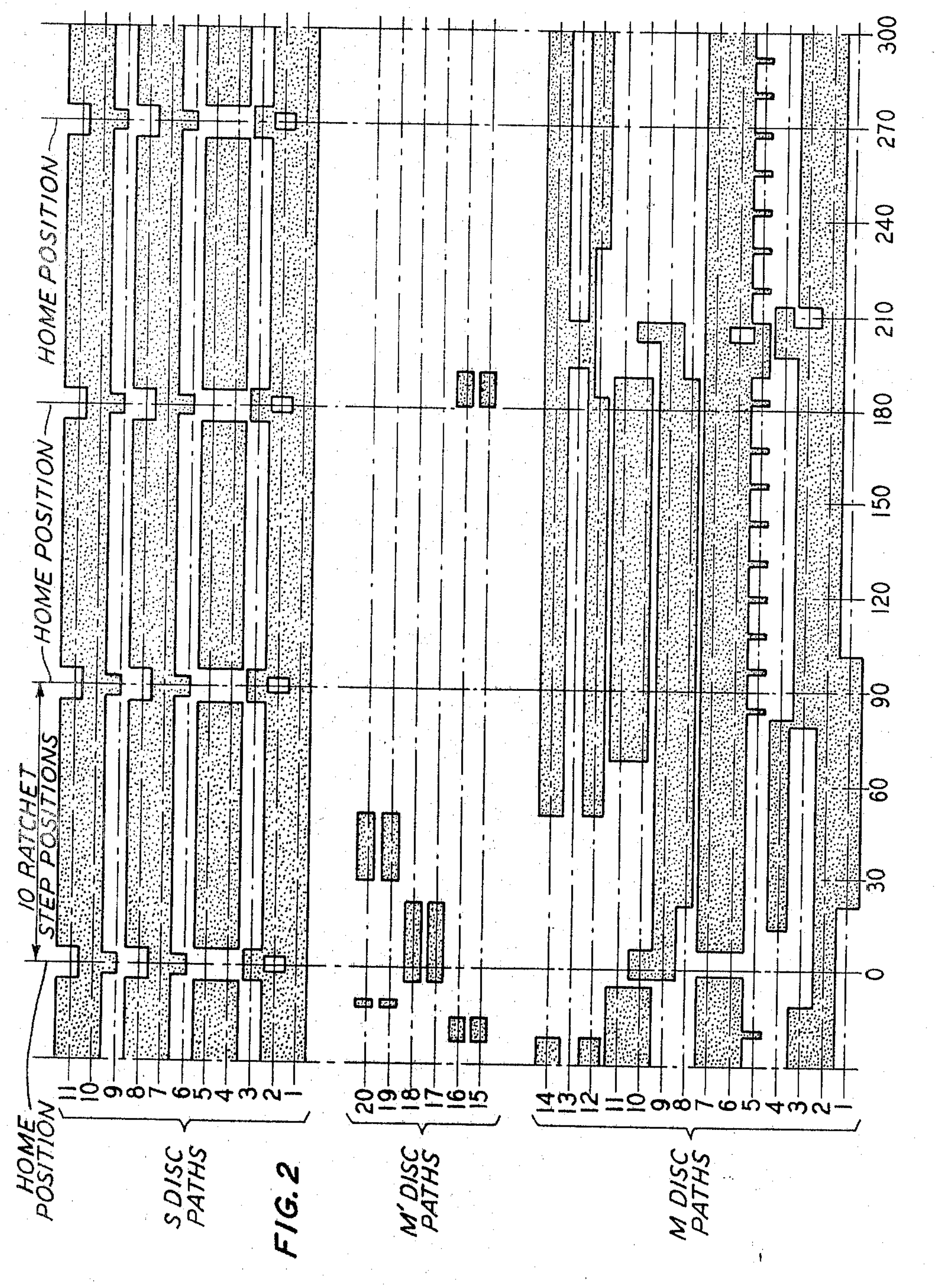
FIG. 2 is a schematic representation of three switching assemblies that provide the switching logic for the reporting set.

Turning now to FIG. 2, the switching logic for the reporting set is provided by relative motion between three discs designated S, M, and M′ and groups of contacts that respectively extend into engagement therewith. Each of the discs comprises a dielectric member having a particular conductive pattern plated thereon. Each group of contacts is spaced along a radius of the disc with which it is associated, and the individual contacts are electrically insulated from one another.

The complete conductive patterns of the S and M discs and a portion of the conductive pattern of the M' disc are graphically shown in FIG. 2. In addition, the paths described by the contacts as relative motion occurs between the contacts and the discs are shown as broken lines spaced along the ordinate and extending along the abscissa of FIG. 2. Also displayed is the home position of the contacts with respect to the conductive patterns, the home position being that which the contacts occupy with respect to the discs when the reporting set is in the standby condition. Finally, angular displacement with respect to the home position is indicated along the abscissa in degrees.

Examining each of the discs individually, it is seen that the S disc has eleven contacts extending into engagement with the pattern thereon. In the case of this disc, the contacts are stationary and the disc rotates therepast. The disc is mounted wih a ratchet wheel on a common shaft and a relay R shown schematically in FIG. 3 has a pawl that extends into engagement with the ratchet wheel. Each energization of the relay R steps the ratchet wheel and thereby the S disc through nine degrees. As shown in FIG. 2, the pattern on the disc repeats itself every ninety degrees so that there are ten steps between home positions.

The interaction between the pattern of the S disc and the eleven contacts provides the equivalent of seven switches designated $S_{1-2}$, $S_{1-3}$, $S_{4-5}$, $S_{6-7}$, $S_{7-8}$, $S_{9-10}$, and $S_{10-11}$. The switches $S_{1-3}$, $S_{6-7}$, and $S_{9-10}$ are normally closed, that is, they are closed in the home position, while all the rest are normally open. It is seen that when the S disc is stepped out of the home position all the normally closed switches open and all the normally open switches close, and they then remain in that state until the disc returns to the home position.

The M disc has fourteen spaced contacts extending into engagement therewith and a motor 22 shown schematically in FIG. 3 acts through a gear train to rotate the disc past the contacts at a speed of 6.62 degrees per second. The interaction between the contacts and the disc provides the equivalent of nine switches designated $M_{1-2}$, $M_{2-3}$, $M_{2-4}$, $M_{5-7}$, $M_{8-9}$, $M_{9-10}$, $M_{10-11}$, $M_{12-14}$, and $M_{13-14}$. The switch $M_{9-10}$ is normally closed and all the rest are normally open. Unlike the S switches, the M switches are not operated as a group when the M disc is displaced from the home position. Rather, they are actuated individually in a particular sequence.

The third disc M' is actually an element of a call transmitter 25 of the reporting set, shown schematically in FIG. 3. As the call transmitter 25 is described in detail in the copending application of N. L. Field-R. E. Waddell, Ser. No. 539,469, filed Apr. 1, 1966, and assigned to the assignee of the present invention, it is unnecessary to describe it in detail in the present application. Hence, all that is shown in FIG. 2 is that portion of the M' disc that is not related to the call transmitter 25.

The contacts that engage the M' disc are driven therepast by the motor 22, and the relative motion between the contacts and the disc is at the same angular velocity as the relative motion between the M disc and the contacts in engagement therewith. Thus the portion of the M' disc shown in FIG. 2 could be incorporated in the M disc.

Six contacts extend into engagement with the portion of the M' disc shown and the interaction therebetween provides the equivalent of three switches. For the purpose of indicating that these switches function in the same manner as the M switches, the three switches are designated $M_{15-16}$, $M_{17-18}$ and $M_{19-20}$. The switch $M_{17-18}$ is normally closed and the other two are normally open.

Referring now also to FIG. 3, it is seen that the M and S switches serve to interconnect the call transmitter 25 and five major subcircuits of the reporting set. The subcircuits comprise a timer circuit 26, a start circuit 27, an amplifier-oscillator circuit 28, a record-play circuit 29, and a supervisory signal detector circuit 30. They and the other elements of the entire circuit will now be examined in the context of the operation of the reporting set.

When the reporting set is in a standby condition a nickel cadmium storage battery 32, which serves as the power source for the reporting set, is connected across and charged from the telephone line with which the set is associated. A path is provided from the tip side of the telephone line through a resistor 34, coils 35A, 35B, 35C, and 35D of a hybrid transformer 35, diode 36A of a bridge rectifier 36, a normally closed switch $A_1D_3$ of the call transmitter 25, and a resistor 38 to the positive side of the battery 32. And a path is provided from the negative side of the battery 32 through a diode 36B of the bridge rectifier 36 to the ring side of the telephone line. The resistor 38 is of a value to restrict current flow to a level whereat the central office is not caused to respond, and thus the battery 32 is charged from the telephone line without interfering with the line.

The battery 32 has an oscillator 40 in the start circuit 27 connected across it at all times, and the oscillator is normally in oscillation. The alternating current developed by the oscillator 40 is rectified by a diode 42 and applied to a capacitor 44 through a varistor 45 and this back-biases a transistor 46 whereby it does not conduct. An alternating current is also developed in a winding 48 that is magnetically coupled to the oscillator 40, and the alternating current is rectified by a diode 50 to charge a capacitor 52, the voltage across the capacitor being limited by a Zener diode 54 connected in parallel therewith.

A normally open switch IN that is provided by the user of the reporting set is also connected in parallel with the capacitor 52. The switch IN is connected across a pair of input terminals, and it is designed to close in response to the occurrence of the condition that the user is employing the reporting set to monitor.

When the reporting set is in a standby condition and this predetermined condition occurs, closing the switch IN, the alarm mode of operation, which comprises a dialing period, a waiting period, and a reporting period, commences with the dialing period. The capacitor 52 is spect to the home position is indicated along the abscissa where it stalls. Since the oscillator 40 no longer generates an alternating current, the back-bias on the transistor 46 ceases, and a forward bias due to current flowing through a resistor 55 connected to the base of the transistor causes it to conduct.

As a result, a charge is applied to a capacitor 56 and a transient signal is applied to the cathode gate of a bistable transistor switch 58, turning the transistor switch on. The relay R is energized, a path being provided from the positive side of the battery 32 through the relay R, the normally closed switch $M_{9-10}$, the normally closed switch $S_{6-7}$, the normally closed contacts of a transfer switch R', and the transistor switch 58 to the negative side of the battery. And the energized relay R operates the transfer switch R' to open the normally closed contacts and close the normally open contacts thereof.

The closed normally open contacts of the transfer switch R' connect the anode of the transistor switch 58 to the anode gate of the bistable transistor switch 60, whereupon the latter turns on and energizes the motor 22 by connecting it across the battery 32. The open normally closed contacts of the transfer switch R' interrupt the energizing path of the relay R, and as the relay is de-energized, a pawl connected to its armature advances a ratchet wheel and thereby the S disc one step from the home position. All the normally closed S switches thereupon open and all the normally open S switches close.

The closed switch $S_{1-2}$ in combination with the normally closed switch $M_{17-18}$ provides an alternate path to that provided by the transistor 46 for connecting the capacitor 56 across the battery 32. Thus regardless of whether the predetermined condition that caused the switch IN to close continues to exist, the charge on the capacitor 56 is maintained.

The significance of this charge is that as long as it remains, the triggering of the transistor switch 58 is inhibited. Therefore if after the reporting set has completed its alarm mode of operation, the predetermined condition remains or it re-occurs intermittently in short time intervals, the reporting set will not be caused to repeat the alarm mode of operation. Only after the charge on the capacitor 56 is dissipated will a closure of the normally open switch IN reinitiate the operation.

The open switch $S_{1-3}$ breaks a ten second timing path of the timer circuit 26, the ten second timing path being hereinafter described. The closed switch $S_{4-5}$, on the other hand, enables the call transmitter 25 by providing a path to the ring side of the telephone line via diode 36B of the bridge rectifier 36.

The open switch $S_{6-7}$ turns off the transistor switch 58 and prevents the relay R from being re-energized by the return of the transfer switch R′ to its normal condition, while the closed switch $S_{7-8}$ provides one segment of an alternate path for energizing the relay. Finally, the open switch $S_{9-10}$ removes a shunt path from across the normally open switches $M_{12-14}$ and $M_{13-14}$, and the closed switch $S_{10-11}$ provides a path between the supervisory signal detector circuit 30 and the transistor switch 58.

The energization of the motor 22 commences the movement of an endless loop of magnetic tape 61, on which is prerecorded the message to be transmitted by the reporting set, past a record-play head 62 of the record-play circuit 29. However, inasmuch as the amplifier-oscillator circuit 28 is not energized, no transmission of the message occurs at this time.

In addition, the energization of the motor 22 commences the sequential actuation of the M switches and the operation of the call transmitter 25. Just after the motor 22 starts, the switch $M_{9-10}$ opens to interrupt the energizing path of the relay R, and the switch $M_{6-7}$ closes to turn off the tarnsistor switch 60 and provides an alternate path for energizing the motor 22.

This is followed by the opening of the switch $A_1D_3$ and the closing of the switch $A_1C$ in the call transmitter 25. The former interrupts the charging path for the battery 32, while the latter in conjunction with the closed switch $S_{4-5}$ seizes the telephone line.

About the same time, the switch $M_{2-4}$ closes and provides an alternate path to that of the normally closed switch $M_{17-18}$ and closed switch $S_{1-2}$ for maintaining the charge on the capacitor 56. Then following the establishment of this alternate path, the switch $M_{17-18}$ opens and interrupts the earlier path.

The switches $M_{1-2}$, $M_{8-9}$, and $M_{19-20}$ thereafter close in sequence. The switch $M_{8-9}$ connects a relay E of the call transmitter 25 into the dialing circuitry. The other two switches are not involved in the alarm mode of operation and hence have no signifiance here.

Approximately five seconds after the telephone line is seized, which time is provided to obtain dial tone, the call transmitter 25 commences to dial the telephone number of the supervisory station. Switches $CD_2$ and $A_2C$ close and the switch $A_1C$ opens. Two paths through the call transmitter 25 then maintain the connection across the telphone line. One path comprises the normally closed switch FG and the closed normally open switch $CD_2$, and the other path comprises a normally closed pulsing switch P, the normally closed contacts of a transfer switch E′ and the closed normally open switch $A_2C$.

The pulsing switch P continuously opens and closes ten times a second, while the switch FG periodically opens for one second intervals. Thus during each interval that the switch FG is open, the pulsing switch P interrupts the telephone line ten times and generates ten dial pulses if no other path is provided across the telephone line.

A third path across the telephone line is, however, provided during each such interval while the preselected number is being dialed unless the selector 14 (FIG. 1) corresponding to that interval is positioned to select the digit zero. The third path comprises a diode 63, a normally open switching matrix SM, and the closed normally open switch $CD_2$.

The switching matrix SM closes during a dialing interval after the pulsing switch P has interrupted the telephone line a number of times corresponding to the position of the selector 14 for that interval. Hence with the first selector 14 positioned to dial a four, the switching matrix SM closes during the first dialing interval after the pulsing switch P has interrupted the telephone line four times. If a selector 14 is positioned to select the letter U, the switching matrix SM closes immediately after the dialing interval commences before any interruption of the telephone line occurs.

After the switching matrix SM closes, it connects the relay E across the battery 32. A path is provided from the positive side of the battery 32 through the relay E, the closed normally open switch $M_{8-9}$, a diode 64, the closed normally open switching matrix SM, the closed normally open switch $CD_2$ and the closed normally open switch $S_{4-5}$ to the negative side of the battery.

The relay E is energized and it operates the transfer switch E′ to open the pair of normally closed contacts and close the pair of normally open contacts thereof. The open normally closed contacts interrupt the path including the pulsing switch P. The closed normally open contacts in conjunction with the closed switch $A_2C$ provide a shunt path around the switching matrix SM. Therefore when the switching matrix SM opens, the closed normally open contacts both maintain the connection of the relay E across the battery 32 and provide a path across the telephone line.

At the end of each dialing interval, the switch FG closes to provide an interdigital period and the switch $A_2C$ opens and de-energizes the relay E whereby the transfer switch E′ returns to its normal condition.

The dialing period lasts for about thirty seconds and nearly all of this time is required if a fourteen digit number is dialed. However, in most cases the telephone number will have less than fourteen digits and therefore there will be time remaining in the period. For example, approximately sixteen seconds are required to dial a seven digit number whereby fourteen seconds remain. The time remaining in the dialing period after the telephone number has been dialed is used for transmitting the prerecorded message. How this is done will now be explained.

During the dialing of the second digit the switch $M_{12-14}$ closes and connects the detector circuit 30 to the cathode gate of the transistor switch 58. Then during the dialing of the fourth digit, the switch $M_{10-11}$ closes and establishes a path for the operation of the relay R through the transistor switch 58. This is followed during the dialing of the fifth digit by the closing of the switch $M_{2-3}$ and the opening of the switch $M_{2-4}$.

The closing of the switch $M_{2-3}$ supplies power to the amplifier-oscillator circuit 28 and the detector circuit 30. In addition, the closing of the switch $M_{2-3}$ provides a path between the capacitor 56 in the start circuit 27 and the positive side of the battery 32 so that when the swich $M_{2-4}$ opens, the charge on the capacitor is maintained. For the balance of the alarm mode of operation, one or the other of these switches maintains the charge on the capacitor 56.

The amplifier-oscillator circuit 28 comprises a timer 65, an amplifier 66, and an oscillator 68, and current for both the amplifier and oscillator is provided by the timer. The timer 65 includes a transistor 70 that has the base thereof connected to one side of the call transmitter 25 and the emitter thereof connected to the other side of the call transmitter. When a path is provided through the call transmitter the base is at the same potential as the emitter so that the transistor 70 is turned off. With the transistor 70 turned off, current provided by the closed switch $M_{2-3}$ goes to charge a capacitor 72. When, however, the path through the call transmitter is interrupted by the transmission of a pulse, the base potential of the transistor 70 is raised above that of the emitter and the transistor turns on. With the transisor 70 on, a transistor 74 is turned on and the capacitor 72 is discharged.

The rate at which the capacitor 72 charges is limited by a resistor 75 so that if no pulses are transmitted for a period of approximately two seconds, which lapse in pulsing subsequent to the closure of the switch $M_{2-3}$ can only occur after the call transmitter 25 has completed dialing the preselected telephone number, the capacitor becomes fully charged to a point whereat a transistor 76 is turned on. This results in a transistor 78 turning on and when the transistor 78 conducts, it provides current for the amplifier 66 and the oscillator 68.

From the foregoing it is seen that in order for the amplifier 66 and the oscillator 68 to be energized it is necessary for the switch $M_{2-3}$ to be closed and for two seconds to have elapsed since the completion of the dialing of the preselected telephone number. This prevents the transmission of the prerecorded message and the oscillator signal during the dialing of the preselected telephone number.

The amplifier 66 consists of two stages which are transformer coupled, the first stage including a transistor 80 and the second stage including a transistor 82. Normally closed contacts of the record-play switch RP connect the record-play head 62 of the record-play circuit 29 to the input of the amplifier 66 while the output of the amplifier is connected to a coil 35E of the hybrid transformer 35 and is thereby coupled to the telephone line. Since the magnetic tape 61 is constantly moving past the record-play head 62 when the motor 22 is running, the message recorded thereon is transmitted out on the telephone line as soon as the amplifier 66 is energized. The prerecorded message typically identifies the location of the reporting set and the particular condition that initiated the alarm mode of operation.

The emitter of transistor 82 in the amplifier 66 is, however, connected to the negative side of the battery 32 through a transistor 84, and as hereinafter explained, the transistor 84 turns off when the detector circuit 30 is activated. The turn-off of the transistor 84 of course results in the turn-off of the transistor 82 and thereby the amplifier 66, and so the transmission of the prerecorded message is interrupted when this occurs.

Energization of the oscillator 68 occurs when, in addition to the previously mentioned requirements, the switches IN and $M_{5-7}$ are closed. The switch IN is closed when the predetermined condition that initiated the alarm mode of operation continues to exist, and with the switch closed the transistor 46 in the start circuit 27 is turned on. When transistor 46 is on, base drive is provided for the oscillator transistor 85. As seen in FIG. 2, the switch $M_{5-7}$ is intermittently closed following the closure of the switch $M_{2-3}$, and the switch $M_{5-7}$ when closed connects the emitter of transistor 85 to negative battery.

The oscillator 68 is therefore intermittently energizable while the prerecorded message is being transmitted. The oscillator 68 when energized generates a high frequency tone signal that serves to identify the reporting set, and if the oscillator is energized at this time, this identification signal is superimposed upon the message. The transmission of the identification signal concurrent with the prerecorded message indicates of course that the predetermined condition still persists.

Thus to briefly recapitulate, approximately two seconds after the call transmitter 25 has completed dialing the telephone number of the supervisory station, the amplifier 66 commences to transmit the prerecorded message out on the telephone line. The message is limited in length to about twelve seconds and therefore where the telephone number of the supervisory station is seven digits in length, it is possible, if a connection to the station is made quickly and the party at the station answers immediately, for the message to be heard. Of course if the predetermined condition exists at the time the message is transmitted, the identification signal will be intermittently superimposed upon the message.

The party at the supervisory station upon hearing the message may reset the reporting set to the standby condition by transmitting a supervisory signal during the dialing period. The supervisory signal comprises a low frequency tone and it is generated by either a TOUCH-TONE pushbutton telephone set or by a tone generator that is an adjunct to a rotary dial telephone set. The signal when generated, is received by the detector circuit 30 of the reporting set.

The detector circuit 30 comprises an input network 86, an amplifying stage 88, a limiting and driving stage 90, and an output network 92. All signals including both those directed to the reporting set and those transmitted by the set are received by the input network 86 via coils 35F and 35G of the hybrid transformer 35. Although the signals transmitted by the set are greatly attenuated by the hybrid transformer loss, in order to prevent the identification signal generated by the amplifier-oscillator circuit 28 from overloading the detector circuit 30, the input network 86 includes a trap 94 that blocks this signal.

Other audible signals pass through the amplifying stage 88 and are applied to the base of a transistor 95 in the limiting and driving stage 90. The transistor 95 is operated at a minimal bias, the emitter being connected to negative battery and the base being held just at the turn-on point. Thus the incoming signal causes the transistor 95 to fluctuate between an on and off condition. When the transistor 95 turns on, the collector drops to negative battery potential and when the transistor turns off the collector goes to a voltage determined by resistors 96 and 97 and positive battery potential. As a result a square wave is provided at the collector, the amplitude of which is dependent upon battery potential.

In addition, by feeding the square wave to a transistor 98 and using a sample of the average current through this transistor to furnish the bias for the base of the transistor 95, a symmetrical square wave is achieved. The symmetrical square wave is fed into a tank circuit 100 in the output network 92, the tank circuit being connected through a reverse bias diode 102 to a transistor 104.

The tank circuit 100 is tuned to resonate at the frequency of the supervisory signal and thus it commences to resonate if the square wave is of this frequency. If the tank circuit 100 is driven hard enough, the juncture with the diode 102 will go far enough negative beyond negative battery for the diode 102 to conduct, the battery 32 providing a threshold that must be exceeded before the diode conducts. Since both this threshold and the amplitude of the square wave are dependent upon battery voltage, compensation is achieved. Thus if the battery voltage is low, the amplitude of the signal provided the tank circuit 100 is also low, but it has a low threshold to overcome. Battery voltage dependency is thereby eliminated.

The transistor 104 is normally turned on, forward bias for the transistor being provided by a resistor 105, and with the transistor on, current through a resistor 106 is shunted around a capacitor 108. When, however, the diode 102 rectifies the signal appearing in the tank circuit 100, it takes away the forward bias for the transistor 104 and thereby turns it off. Then the current through the resistor 106 commences to charge the capacitor 108.

If the signal of the proper frequency is sporadic, the transistor 104 is intermittently turned on, and each time it turns on the capacitor 108 is completely discharged. If, however, the signal of the proper frequency is continuous, the transistor 104 is turned off for a continuous period of time. The charge on the capacitor 108 then reaches the breakdown voltage of a Zener diode 110 connected thereto, and the diode conducts.

In addition, when the transistor 104 is turned off, bias is no longer provided for the transistor 84 in the amplifier 66 of the amplifier-oscillator circuit 28, and the transistor 84 turns off. As indicated in the discussion with respect to the amplifier-oscillator circuit 28, this results in the amplifier 66 being turned off. The transmission of the prerecorded message and of the identification signal is thereby prevented from interferring with the receipt of the supervisory signal and should the prerecorded message happen to include bursts at the same frequency as the supervisory signal, it is prevented from providing a false input.

If the supervisory signal is transmitted during the dialing period, the reporting set is reset to a standby condition. This is because the switch $M_{12-14}$ is closed and when the diode 110 in the output network 92 conducts, an input is provided to the cathode gate of the transistor switch 58 and it is turned on. Since the switches $M_{10-11}$ and $S_{7-8}$ are both closed, the relay R is energized, and the transfer switch R′ is operated to open the normally closed contacts thereof whereby the energizing path of the relay is interrupted. The relay R is thereby de-energized and the transfer switch R′ returned to its normal condition, at which time the relay is again energized. Hence the relay R is repetitively energized and de-energized and each time it is de-energized the S disc is stepped nine degrees. This continues until the S disc has stepped through ninety degrees from the home position whereupon all the S switches return to their normal condition and the opening of the switch $S_{7-8}$ prevents further energization of the relay R.

The return of the S switches to their normal condition also opens the switch $S_{4-5}$ and as a result the reporting set drops the telephone line. The motor 22 continues to run, however, and seconds later the switch $A_1D_1$ in the call transmitter 25 closes and reseizes the telephone line by providing a path across the line shunting the open switch $S_{4-5}$.

At about the same time, the switch $M_{15-16}$ closes and discharges a pair of capacitors 112 and 114 in the timer circuit 26. The capacitors 112 and 114 accumulate a charge when immediately after the commencement of the alarm mode of operation the switch $M_{17-18}$ closes for about three seconds, the switch $S_{1-2}$ being closed and the switch $S_{1-3}$ being open, following which the switch $M_{2-4}$ closes for about ten seconds. When either of these connections to plus battery exists current flows through resistors 115 and 116 and a diode 118 to charge the capacitors 112 and 114. As further described below, the accumulation of the charge on the capacitors 112 and 114 serves as the timing means of the timer circuit 26 and by releasing the charge thereon, the timing means is effectively reset to zero.

About a second after the switch $M_{15-16}$ closes it reopens, and the switch $M_{2-4}$ then closes followed immediately by the opening of the switch $M_{6-7}$. The opening of the switch $M_{6-7}$ de-energizes the motor 22 while the closing of the switch $M_{2-4}$ again initiates the operation of the timer circuit 26.

Current flows through the resistors 115 and 116 and the diode 118 to charge the capacitors 112 and 114. The charging of the capacitors 112 and 114, though, provides bias for a transistor 120 and it is turned on. Thus a large portion of the current flowing through the resistors 115 and 116 is diverted from the capacitors 112 and 114. However, current for charging the capacitors 112 and 114 also flows through the closed switch $S_{1-3}$, a resistor 122, and a diode 124, and the diode 118 prevents this current from being diverted by the transistor 120. The capacitors 112 and 114 thereby accumulate a charge relatively quickly.

After approximately ten seconds the charge on the capacitors 112 and 114 reaches the breakdown voltage of a Zener diode 125 and it commences to conduct. At the same time the charge on the capacitors 112 and 114 removes the bias from the transistor 120 and it turns off. Thus all current flow occurs through the diode 125 and it provides bias for a transistor 126 to turn it on. When the transistor 126 turns on, an input is provided for the transistor switch 60 in the start circuit 27 and it turns on and energizes the motor 22.

With the motor 22 running, the sequential actuation of the M switches and the switches in the call transmitter 25 continues. However, only four switches are of consequence in the present circumstances. Shortly after the motor is energized, the switch $A_1D_1$ in the call transmitter 25 opens and drops the telephone line. Shortly before the M and M′ discs return to their home position, the switch $M_{15-16}$ briefly closes and discharges the capacitors 112 and 114 in the timer circuit 26, and the switch $M_{2-3}$ opens and interrupts the charging path for the capacitor 56 in the start circuit 27. Unless the normally open switch IN is closed, whereby the transistor 46 is turned on and an alternate charging path is provided, the charge on the capacitor commences to dissipate through a resistor 128.

Finally, upon the return of the M disc and the contacts engaging the M′ disc to the home position, the switch $M_{6-7}$ opens and de-energizes the motor 22. The reporting set is thereby reset to the standby condition inasmuch as the S disc had already been returned to the home position. The reporting set is able to respond to another closure of the switch as soon as the charge on the capacitor 56 is dissipated. This typically takes about twenty seconds if the switch IN remains open continuously.

From the foregoing it is seen that if the party at the supervisory station upon hearing the prerecorded message transmits the supervisory signal during the dialing period, the reporting set is reset to a standby condition. If, however, the party at the supervisory station does not so respond, as when he does not answer the call in time to hear the message, the dialing period terminates with the opening of the switch $A_2C$ and the closing of the switch $A_1C$. No further dialing by the call transmitter 25 can thereafter take place, and a continuous path through the call transmitter is provided.

At approximately the same time, the switch $M_{12-14}$ opens and interrupts the path between the detector circuit 30 and the transistor switch 58 in the start circuit 27. It is followed by the opening of the switch $M_{10-11}$ and the closing of the switch $M_{5-7}$. The former breaks the energizing path for the relay R, while the latter connects the oscillator 68 of the amplifier-oscillator circuit 28 to negative battery .

Immediately thereafter the switch $M_{8-9}$ opens and breaks the energizing path for the relay E in the call transmitter 25, and the switch $M_{12-14}$ closes and provides in combination with the closed switch $S_{10-11}$ a path between the output network 92 of the detector circuit 30 and the cathode gate of the transistor switch 60 in the start circuit 27. Furthermore, the switch $M_{2-4}$ closes, initiating the operation of the timer circuit 26 and energizing the oscillator 68, and the switch $M_{6-7}$ opens de-energizing the motor 22. Transmission of the identification signal is thereby commenced and transmission of the prerecorded message is discontinued.

At this point the waiting period of the alarm mode of operation commences, and if the supervisory signal is transmitted at any time during the period, the output network 92 of the detector circuit 30 provides current to the cathode gate of the transistor switch 60. The transistor switch 60 thereupon turns on and the motor 22 is energized.

If, on the other hand, the supervisory signal is not transmitted during the waiting period, the timer circuit 26 acts to energize the motor 22 at the end of approximately thirty seconds. Charging current for the capacitors 112 and 114 of the timer circuit 26 is only provided through the resistors 115 and 116 and the diode 118, and as stated above, a large portion of the current through the resistors is diverted from the capacitors by the transistor 120. Thus the capacitors 112 and 114 accumulate a charge relatively slowly, and it takes about thirty seconds before the charge on the capacitors reaches the breakdown voltage of the diode 125. When the diode 125 conducts, bias is provided for the transistor 126 and it turns on to provide current to the cathode gate of the transistor switch 60. As before, this turns on the transistor switch 60 and energizes the motor 22.

Upon the energization of the motor 22, the sequential actuation of the M switches continues with the opening of the switch $M_{2-3}$ and the closing of the switch $M_{6-7}$. The former removes power from the amplifier-oscillator circuit 28 and thereby prevents transmission of the prerecorded message. The purpose of this is hereinafter explained with respect to the inquiry mode of operation. The latter provides an energizing path for the motor 22 that shunts the transistor switch 60 and turns the transistor switch off.

This is followed by the opening of the switch $M_{5-7}$, whereupon the oscillator 68 is de-energized and the transmission of the identification signal terminated, and the opening of the switch $M_{13-14}$, whereupon the path between the detector circuit 30 and the transistor switch 60 of the start circuit 27 is broken. This signifies the end of the waiting period.

The switch $M_{2-3}$ then closes, providing power to the amplier-oscillator circuit 28 and the detector circuit 30, and transmission of the prerecorded message out on the telephone line commences. In addition, the switch $M_{2-4}$ opens, breaking the charging path for the timer circuit 26. Finally the switch $M_{12-14}$ closes and provides a path between the output network 92 of the detector circuit 30 and the cathode gate of the transistor switch 58 of the start circuit 27, and the switch $M_{10-11}$ closes and provides a connection between the relay R and the anode of the transistor switch 58. At this point the reporting period of the alarm mode of operation commences.

It is therefore seen that if the supervisory signal is transmitted during the waiting period, the waiting period is quickly terminated where as if the supervisory signal is not transmitted, the waiting period runs its full course. In either case the reporting period commences shortly after the waiting period is terminated.

The prerecorded message is transmitted throughout the reporting period and if the switch IN is closed, the identification signal is periodically superimposed thereon. If the supervisory signal is received during the reporting period, the reporting set is reset to a standby condition in a similar manner to that described with respect to when the supervisory signal is received during the dialing period. The detector circuit 30 responds to the supervisory signal by supplying trigger current to the cathode gate of the transistor switch 58 in the start circuit 27, and the relay R steps the S disc to the home position. The telephone line is thereupon dropped while the motor 22 continues to run until the M disc and the contacts engaging the M′ disc are returned to their home positions whereupon the S and M switches and the switches of the call transmitter 25 are all returned to their normal condition.

If the supervisory signal is not received during the reporting period, as would be the case if the supervisory station is busy or does not answer the call, at the end of the period the switch $A_1C$ opens and drops the telephone line. At about the same time, the switch $M_{15-16}$ closes and discharges the capacitors 112 and 114 in the timer circuit 26, and the switch $M_{12-14}$ opens and breaks the connection between the detector circuit 30 and the transistor switch 58 in the start circuit 27. Seconds later the switch $M_{15-16}$ opens and the switch $M_{19-20}$ closes and energizes the relay R long enough to operate the transfer switch R′ once. The S disc is thereby advanced one step toward the home position.

Thereafter switch $M_{2-3}$ opens to remove power from the amplifier-oscillator circuit 28 and detector circuit 30, the switch $M_{10-11}$ opens to break one energizing path for the relay R, and the switch $M_{17-18}$ closes to provide a charging path for the timer circuit 26. This is followed by the closing of the switch $M_{9-10}$ and the opening of the switch $M_{6-7}$, the latter de-energizing the motor 22. The M and M′ discs are then in the home position whereby the M switches and the switches in the call transmitter 25 are in their normal condition.

The S disc is not however in the home position, and thus the switch $S_{1-2}$ is closed, and it in combination with the closed switch $M_{17-18}$ supplies current to the timer circuit 26. The current flows through the resistors 115 and 116 and the diode 118 to charge the capacitors 112 and 114, and after about thirty seconds the charge on the capacitors causes the diode 125 to conduct. The transistor 126 turns on, and it in turn turns on the transistor switch 60. The motor 22 is energized, and the alarm sequence comprising the dialing period, waiting period and reporting is again repeated.

In this manner up to nine calls in succession can be made following a closure of the switch IN until the S disc is single stepped to its home position. Of course, if the supervisory signal is transmitted during any dialing or reporting period, the reporting set is reset to the standby condition at that time.

Besides the alarm mode of operation just described, the reporting set also has an inquiry mode of operation, and it is initiated by an incoming call when the reporting set is in the standby condition. Ringing voltage applied to the telephone line is rectified by the bridge rectifier 36, and the alternating current component of rectified voltage passes through a capacitor 130 and a resistor 132 to a Zener diode 134. The positive portion of the alternating current signal passes through the diode 134 and some of its flows through a resistor 135 and a diode 136 to charge the capacitors 112 and 114, while the rest of it flow through a Zener diode 138 after the breakdown voltage of the diode is exceeded. The negative portion of the signal flows through the diodes 134 and 138 after the breakdown voltage of the diode 134 has been exceeded.

After three to four rings the charge on the capacitors 112 and 114 exceeds the breakdown voltage of the diode 125, and the bias provided thereby turns on the transistor 126. Current flow through the transistor 126 turns on the transistor switch 60, and the motor 22 is energized. Since the S switches remain unactuated, the telephone line is not terminated when the switch $A_1C$ in the call transmitter 25 closes. Furthermore, because the switch $M_{9-10}$ opens shortly thereafter, the transistor switch 58 is not turned on nor the relay R energized when the switch $M_{2-4}$ closes and applies power to the capacitor 56 in the start circuit 27.

However, several seconds later when the switch $M_{8-9}$ closes, the transient response of the start circuit 27 is such that due to the charge on the capacitor 56, the voltage at the cathode gate of the transistor switch 58 may be sufficient to turn it on, whereby the relay E is energized. To quickly de-energize the relay E if this occurs, the switch $M_{19-20}$ closes shortly thereafter and shorts the transistor switch 58. The transistor switch 58 is thereby turned off, breaking the energizing path for the relay.

About 30 seconds after the motor 22 is energized, the switch $A_1D_1$ in the call transmitter 25 closes and terminates the telephone line. This is preceded by the closing of the switch $M_{5-7}$, whereby the oscillator 68 of the amplifier-oscillator circuit 28 is connected to negative battery, and the closing of the switch $M_{13-14}$, whereby the output network 92 of the detector circuit 30 is connected to the cathode gate of the transistor switch 58.

Immediately after the telephone line is terminated, the switch $M_{2-4}$ closes, and since the normally open switch $M_{2-3}$ has already closed, the oscillator 68 is energized and the identification signal is transmitted out on the telephone line. The switch $M_{9-10}$ then closes and connects the anode of the transistor switch 58 to the relay R and the switch $M_{6-7}$ opens and de-energizes the motor 22.

If the supervisory signal is transmitted at this time, the output from the detector circuit 30 turns on the transistor switch 58 and energizes the relay R. The transfer switch R′ is operated, and the closed normally open contacts thereof connect the anode of the transistor switch 58 to the anode gate of the transistor switch 60, turning it on. In addition, the open normally closed contacts of the transfer switch R′ break the energizing path for the relay R. As the de-energized relay R returns the transfer switch R′ to its normal condition, all the S switches transfer the switch whereby $S_{6-7}$ opens and prevents the relay from being re-energized.

With the S disc stepped from the home position and the motor 22 running, the logical operation of the reporting set is from this point forth the same as that which occurs in the alarm mode of operation starting with the termination of the waiting period. Thus the reporting set can be considered to have shifted to that mode of operation.

If the supervisory signal is not received by the reporting set, about ten seconds after the reporting set terminates the telephone line, the charge on the capacitors 112 and 114 reaches the breakdown voltage of the diode 125, the capacitors being connected to plus battery through the closed switches $M_{2-4}$ and $S_{1-3}$, the resistor 122, and the diode 124. The diode 125 conducts and turns on the transistor 126, which in turn turns on the transistor switch 60 to energize the motor 22.

The switch $M_{2-3}$ opens immediately, removing power from the amplifier-oscillator circuit 28 and does not close again until after the switch $A_1D_1$ opens and drops the telephone line. Thus the prerecorded message is not transmitted during the time that the reporting set is hanging up. The motor 22 continues to run until the M disc and the contacts engaging the M′ disc return to their home position whereat the reporting set is again in the standby condition.

As an option, the inquiry mode of operation can be used to actuate subscriber owned equipment, as for example, equipment that attempts to correct the predetermined condition that initiates the alarm mode of operation. This is achieved by providing a relay K in series with a switch $M_{9-10}'$ that closes concurrently with the switch $M_{13-14}$, the relay K and switch $M_{9-10}'$ being connected between the switch $S_{6-7}$ and the positive side of the battery 32. Thus when the supervisory signal is transmitted in response to the ten second identification signal, both the R relay and the K relay are energized by the turning on of the transistor switch 58. The energized relay K serves to actuate the subscriber's equipment, and if the equipment corrects the predetermined condition, the supervisory station is appraised of this fact by the absence of the identification signal during the transmission of the predetermined message.

To record the message that the reporting set transmits, the record-play switch RP of the record-play circuit 29 is moved to the record position. The record-play head 62 is thereupon disconnected from the input of the amplifier 66 of the amplifier-oscillator circuit 28 and connected to the internal circuitry of the record-play circuit 29 instead. In addition, a short is removed from across an erase head 140 and the anode gate of the transistor switch 60 is connected to negative battery.

The motor 22 is thereupon energized and the logical functioning of the reporting set proceeds the same as in the inquiry mode of operation except for those differences resulting from the record-play switch RP being in the record position. Thus when the switch $M_{1-2}$ closes, power is provided to the record-play circuit 29. The record lamp 18 is illuminated, indicating that the recording of the message is to commence, and as the message is spoken into the microphone 20, the signal generated thereby is amplified by a transistor 142 and applied to the record-play head 62. Direct current bias, supplied through a resistor 144, insures that a linear signal is recorded. Since the magnetic tape 61 moves past the erase head 140 and then the record-play head 62, the previous message recorded on the tape is removed before the new message is recorded. The switch $M_{1-2}$ remains closed for approximately twelve seconds and so a message of that length may be recorded.

When the switch $M_{1-2}$ opens, the record lamp 18 extinguishes giving a visible indication that the recording period is over. The record-play switch RP is returned to the play position and the reporting set proceeds to reset to a standby condition in the same manner as in the inquiry mode of operation.

Although a specific embodiment of the invention has been shown and described, it will be understood that it is but illustrative and that various modifications may be made without departing from the scope and spirit of this invention as defined in the appended claims.

What is claimed is:

1. A telephone reporting set comprising:

means responsive to the occurrence of a predetermined condition for initiating a sequence comprising a dialing period, a waiting period, and a reporting period;

means operative during the dialing period for seizing the telephone line and dialing a supervisory station;

means operative during the waiting period for transmitting a signal identifying the reporting set;

means operative during the reporting period for transmitting a message; and means for detecting a signal transmitted by the supervisory station, the detecting means in response to the transmission of the supervisory signal during the waiting period causing the waiting period to be terminated and the reporting period initiated.

2. A telephone reporting set as in claim 1 wherein the detecting means in response to the transmission of the supervisory signal during the reporting period causes the telephone line to be dropped and the operation of the reporting set terminated.

3. A telephone reporting set as in claim 1 wherein the identification signal comprises a tone and the message comprises a verbal statement, and the identification signal is intermittently superimposed upon the message if the predetermined condition continues to exist at the time the message is transmitted.

4. A telephone for automatically reporting the occurrence of a predetermined condition, the telephone comprising:

means responsive to an incoming call from a calling station for terminating an associated telephone line and transmitting a signal to the calling station;

means responsive to a return signal from the calling station for transmitting a message regardless of whether the predetermined condition exists at the time; and means for transmitting a signal to the calling station simultaneously with the message if the predetermined condition exists at the time the message is transmitted.

5. A telephone reporting set comprising:

means responsive to the occurrence of a predetermined condition for seizing a telephone line and dialing a preselected station;

means operative after the dialing of the preselected station for transmitting a signal identifying the reporting set to the preselected station; and means for detecting a signal transmitted by the preselected station, the detecting means in response to the transmission of the signal from the preselected station during the transmission of the identification signal causing the transmission of the identification signal to be terminated and the transmission of a message to be initiated.

6. A telephone reporting set as in claim 5 wherein the detecting means in response to the transmission of a signal from the preselected station during the transmission of the message causes the telephone line to be dropped and the operation of the reporting set terminated.

7. A telephone reporting set comprising:

means for establishing a sequence of operation comprising a dialing period, a waiting period, and a reporting period, the sequence means being enabled responsive to the occurrence of the predetermined condition;

means for seizing a telephone line and calling a supervisory station, the calling means being enabled by the sequence means at the commencement of the dialing period;

means for transmitting a signal to the supervisory station identifying the reporting set, the signal means being enabled by the sequence means during the waiting period;

means for transmitting a message, the message means being enabled by the sequence means during the waiting period;

means for transmitting a message, the message means being enabled by the sequence means during the dialing period and the reporting period;

means for disabling the message means during the calling of the supervisory station;

means for detecting a signal transmitted by the calling station, the detecting means being enabled by the sequence means during the dialing period, the waiting period and the reporting period, the detecting means responding to the supervisory signal during the waiting period by causing the waiting period to be terminated and the reporting period initiated, the detecting means further responding to the supervisory signal during the dialing period and the reporting period by causing the telephone line to be dropped and the operation of the reporting set terminated.

8. A reporting set as in claim 7 wherein the signal means is periodically enabled by the sequence means at the same time that the message means is enabled if the predetermined condition continues to exist.

9. A telephone reporting set as in claim 7 wherein upon the failure to receive the supervisory signal during the dialing period and the reporting period, the calling means drops the telephone line at the end of the reporting period and the sequence means reinitiates the sequence of operation after an interval of time.

10. A telephone reporting set as in claim 9 wherein the operation of the reporting set is terminated responsive to the completion of a fixed number of sequences of operation.

11. A telephone reporting set comprising:

means responsive to the occurrence of a predetermined condition for seizing a telpehone line and dialing a preselected station;

means for transmitting a message following the completion of the dialing of the preselected station informing the preselected station of the occurrence of the predetermined condition; and means for transmitting a particular signal concurrent with the message if the predetermined condition continues to exist at the time the message is transmitted.

References Cited

UNITED STATES PATENTS

| | | | |
|---|---|---|---|
| 1,765,554 | 6/1930 | Wensley. | |
| 2,555,714 | 6/1951 | Talbot. | |
| 3,133,992 | 5/1964 | Dickman | 179—6 |
| 3,166,641 | 1/1965 | Kreiner | 179—5 |
| 3,287,500 | 11/1966 | Moore. | |
| 3,233,232 | 2/1966 | Brennon | 179—5 |
| 3,327,060 | 6/1967 | Hogan | 179—5 |
| 3,383,467 | 5/1968 | New et al. | 179—2 |
| 3,383,469 | 5/1968 | Goodman. | |

WILLIAM C. COOPER, Primary Examiner